J. W. WUENSCH.
TAG HOLDER.
APPLICATION FILED JULY 18, 1921.
1,392,548.
Patented Oct. 4, 1921.
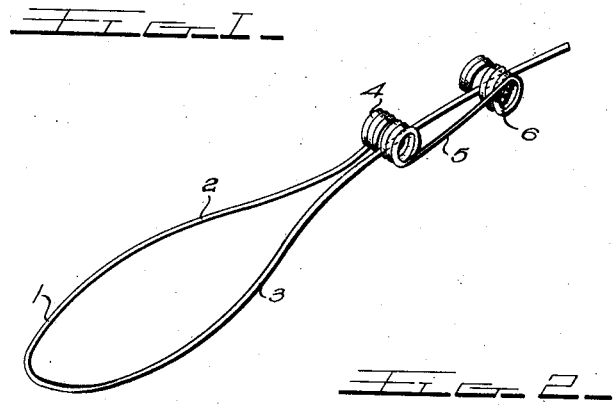
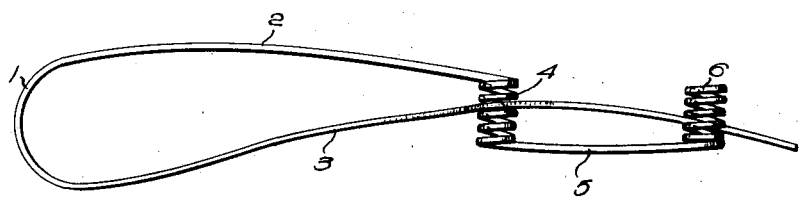
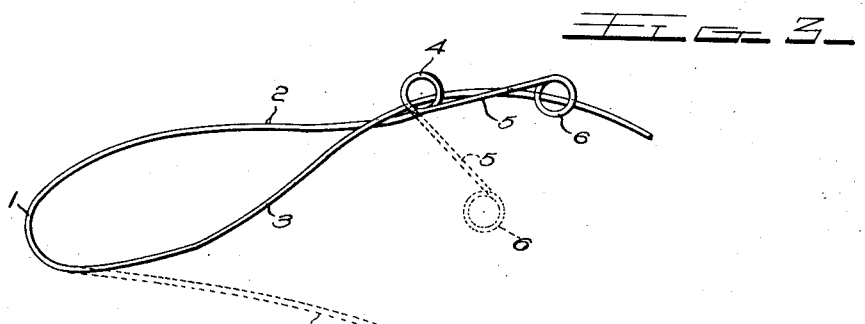
Inventor
Joseph W. Wuensch.
By
C. M. Parker Attorney

UNITED STATES PATENT OFFICE.

JOSEPH WM. WUENSCH, OF ST. PAUL, MINNESOTA.

TAG-HOLDER.

1,392,548.

Specification of Letters Patent.   Patented Oct. 4, 1921.

Application filed July 18, 1921.   Serial No. 485,512.

*To all whom it may concern:*

Be it known that I, JOSEPH W. WUENSCH, a citizen of the United States, residing at St. Paul, in the county of Ramsey and State of Minnesota, have invented certain new and useful Improvements in Tag-Holders, of which the following is a specification.

This invention relates to tag holders, and it comprises a loop formed of spring wire, or other material, the ends of the loop being normally spaced from each other, a coil formed near one end of said loop, the wire beyond the coil being extended at an angle toward the other end of the loop, a second coil arranged on the end of said extension, the other end of said loop being adapted to be arranged between a pair of convolutions of said first coil, and being carried over said extension and arranged between convolutions of said second coil.

In the present invention, I have provided a tag holder suitable for use in many different ways, which is constructed of a single piece of spring wire and which may be effectually locked or sealed when in use. The wire is made in the form of a loop and one end is adapted to be secured between the convolutions of a coil formed in the other end. Beyond the coil, the wire is extended at an angle, and this extension is adapted to be positioned beside the free end of the loop, after the free end has been arranged in the first coil. A second coil is formed on the free end and is adapted to receive the free end of the loop whereby the members are placed under tension and held in locked or sealed position.

The device may be readily unfastened by removing the end of the loop from the outer coil and then from the inner coil.

In the accompanying drawings, I have shown one embodiment of the invention. In this showing:

Figure 1 is a perspective view showing the device locked or sealed,

Fig. 2 is a side elevation, and,

Fig. 3 is a top plan view of the device sealed, the open position being illustrated in dotted lines.

Referring to the drawings, the reference numeral 1 designates the body portion of the loop, which is provided with two ends 2 and 3. Referring to Fig. 3 of the drawings, it will be seen that when the loop is unsealed, the end 3 is spaced from the other end of the loop. Intermediate the end and the loop, the member 2 is provided with a series of convolutions 4, forming a coil. Beyond the coil, the member is provided with an extension 5, which is arranged at an angle to the body portion and, when in open position, projects toward the member 3. The end of the member 5 is provided with a series of convolutions 6, forming a coil.

When the device is to be used, the member 3 is passed through the eye or opening formed in the tag or other card to be held thereby, and the ends are brought together and crossed, the member 3 being arranged between two of the convolutions of coil 4, after it has been arranged over the member 2. The extension 5 is then arranged at an angle to the end of the member 2. The extension is moved from the dotted line position, in Fig. 3 of the drawings, to the full line position adjacent the end of the member 3, and the member 3 is arranged between the loops of the coil 6 on the opposite side from its arrangement between the loops of the coil 4.

It will be seen that the extension is maintained in locked position by engagement with the member 3, and this engagement with the member 3 prevents accidental disengagement of the member 3 from the coil 4. The device may be readily opened by removing the end of member 3 from the coil 6, when the parts will assume the position shown in Fig. 3, with the extension 5 in dotted line position, and the member 3 may be then removed or disengaged from the coil 4, permitting it to assume its dotted line position.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. A card or tag holder comprising a loop of wire, the ends of which are normally spaced from each other, a coil formed near one of said ends, the portion beyond the coil being extended at an angle and normally spaced from the other end of the loop, the other end of said loop being adapted to be arranged between the convolutions of said coil, and means for securing said extension to said end whereby the tension created in said extension will retain the parts in position.

2. A card or tag holder comprising a loop of wire, the ends of which are normally spaced from each other, a coil formed near one of said ends, the portion beyond the coil being extended at an angle, a second coil formed on the end of said extension, the other end of the loop being adapted to be arranged between the convolutions of said first coil, and the extreme end thereof being arranged between the convolutions of said second coil.

3. A card or tag holder comprising a loop of wire, the ends of which are normally spaced from each other, a coil formed near one end of said loop, the portion beyond the coil being extended at an angle thereto and toward the other end of the loop, a coil formed on the end of said extended portion, the other end of the loop being adapted to be closed over said first end and secured between the convolutions of said first coil, said extension being adapted to be arranged adjacent said other end with said other end positioned between the convolutions of said second coil.

In testimony whereof I affix my signature in presence of two witnesses.

JOSEPH WM. WUENSCH.

Witnesses:
J. P. ANDERSON,
E. J. EMERY.